United States Patent
Ball et al.

(10) Patent No.: US 6,751,987 B1
(45) Date of Patent: Jun. 22, 2004

(54) BURNERS FOR PRODUCING BOULES OF FUSED SILICA GLASS

(75) Inventors: Laura J. Ball, Fountaine le Port (FR); Raymond E. Lindner, Corning, NY (US); Mahendra Kumar Misra, Horseheads, NY (US); Dale R. Powers, Painted Post, NY (US); Michael H. Wasilewski, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/787,399

(22) PCT Filed: Sep. 17, 1999

(86) PCT No.: PCT/US99/21658

§ 371 (c)(1),
(2), (4) Date: Jul. 24, 2001

(87) PCT Pub. No.: WO00/17115

PCT Pub. Date: Mar. 30, 2000

Related U.S. Application Data

(60) Provisional application No. 60/101,403, filed on Sep. 22, 1998.

(51) Int. Cl.$^7$ ................................................ C03B 19/06
(52) U.S. Cl. ..................... 65/17.4; 65/531; 65/413; 65/414; 65/415; 65/416; 65/355; 431/127; 431/128; 431/129; 431/153; 431/177; 431/195; 239/270
(58) Field of Search ................. 65/17.4, 531, 413–416, 65/355; 431/127–129, 153, 177, 195–198; 239/270; 423/335–337

(56) References Cited

U.S. PATENT DOCUMENTS

| | | | |
|---|---|---|---|
| 4,826,520 A | * | 5/1989 | Kawazoe et al. ............ 65/3.12 |
| 5,599,371 A | * | 2/1997 | Cain et al. .................... 65/413 |
| 5,922,100 A | * | 7/1999 | Cain et al. .................... 65/531 |

* cited by examiner

*Primary Examiner*—Steven P. Griffin
*Assistant Examiner*—Mark Halpern
(74) *Attorney, Agent, or Firm*—Timothy M. Schaeberle

(57) ABSTRACT

Burners (14) are used to make glass bodies (19) from OMCTS. The burners have six concentric regions. Putting certain gases through the regions results in thicker bodies than can be achieved with existing techniques and with improved efficiency.

22 Claims, 4 Drawing Sheets

BURNERS FOR PRODUCING BOULES OF FUSED SILICA GLASS

CROSS REFERENCE TO RELATED APPLICATIONS

This application is the U.S. national phase under 35 USC §371 of International Application No. PCT/US99/21658, filed Sep. 17, 1999, which was published in English under PCT Article 21(2) on Mar. 30, 2000 as International Publication No. WO 00/17115. This application claims the benefit under 35 USC §119(e) of U.S. Provisional Application No. 60/101,403 filed Sep. 22, 1998, the contents of which in its entirety is hereby incorporated by reference.

FIELD OF THE INVENTION

This invention relates to burners for producing boules of fused silica glass, such as, high purity fused silica glass (HPFS glass) and ultra low expansion glass, from halide-free, silicon-containing (HF-SC) starting materials, such as, octamethyl-cyclotetrasiloxane (OMCTS).

BACKGROUND OF THE INVENTION

Fused silica glass is made commercially by the assignee of this invention using furnaces of the type shown in commonly-assigned PCT Patent Publication No. WO 97/10182, the contents of which are incorporated herein by reference. FIG. 7 hereof is a copy of FIG. 4 of WO 97/10182. In overview, furnaces of this type utilize flame hydrolysis to produce and deposit fine silica particles (silica soot) on a planar surface (e.g., a layer of bait sand) which is then consolidated into a solid glass boule. More particularly, furnaces of this type operate at a sufficiently high temperature so that the consolidation takes place essentially simultaneously with the depositing of the silica soot.

As shown in FIG. 7, furnace 100 includes crown 12 which carries a plurality of burners 14 which produce the silica soot which is collected to form boule 19, which typically has a diameter on the order of five feet (1.5 meters). The present invention is concerned with the structure and operation of burners 14.

In the past, burners 14 have been unable to deposit soot in a sufficient manner at distances greater than six inches from the burner face, which has meant that the maximum boule thickness has been six inches. To meet the demand for fused silica products, especially, HPFS glass, it would be desirable to produce boules having a thickness greater than six inches, e.g., boules having a thickness of 8–10 inches. The present invention is directed to providing burners capable of producing such boules.

Commonly-assigned U.S. Pat. No. 5,599,371 (the '371 patent) describes burners suitable for use in producing preforms for optical waveguide fibers from HF-SC starting materials. As explained in that patent, prior burners used to produce preforms from starting materials which contained halides (hereinafter the "halide burner") had five concentric gas-emitting regions: 1) a central region (fume tube) which emitted a mixture of a halide-containing/silicon-containing starting material (e.g., $SiCl_4$) and an inert gas, 2) an innershield region which emitted oxygen, 3) a third region which emitted a mixture (premix) of a combustible gas and oxygen, 4) a fourth region which also emitted a mixture (premix) of a combustible gas and oxygen, and 5) an outershield region which emitted oxygen.

As explained in the '371 patent, when an HF-SC starting material was substituted for the halide-containing/silicon-containing starting material previously used to produce preforms, it was found that the gases emitted from the various regions of the burner had to be changed. In particular, instead of the above gases, the five concentric gas-emitting regions of the burner of the '371 patent emitted the following gases: 1) the fume tube emitted a mixture of the HF-SC starting material and oxygen plus, optionally, an inert gas, 2) the innershield emitted an inert gas, 3) the third region emitted oxygen, 4) the fourth region emitted oxygen, and 5) the outershield emitted a mixture (premix) of a combustible gas and oxygen.

In the course of the development of the burner of the present invention, an attempt was made to use a burner having the gas arrangement of the '371 patent. It was surprisingly found that although such a burner works successful in producing optical waveguide preforms from HF-SC starting materials, it does not work particularly well in producing boules from such materials. In particular, it does not work successfully in producing thick boules from such starting materials.

Rather, in accordance with the invention, it was found that to successfully make a thick boule from an HF-SC starting material, the burner has to have the following concentric regions emitting the following gases: 1) a central region (fume tube) which emits a mixture of an HF-SC starting material and an inert gas, 2) an innershield region which emits oxygen, 3) a third region which emits a mixture (premix) of a combustible gas and oxygen, 4) a fourth region which emits a mixture (premix) of a combustible gas and oxygen, 5) a fifth region which emits a mixture (premix) of a combustible gas and oxygen, and 6) an outershield region which emits oxygen.

The foregoing burner history illustrates the difficulties in predicting whether a particular gas arrangement will work with a particular starting material (i.e., a halide-containing starting material versus a halide-free material) to produce a particular product (i.e., an optical waveguide preform versus a thick boule). Thus, an oxygen/premix/premix/oxygen arrangement surrounding a fume tube carrying a halide-containing raw material worked to produce preforms in the halide burner referred to above, but did not work when the raw material was halide free. Similarly, an inert gas/oxygen/oxygen/premix arrangement surrounding a fume tube carrying a halide-free raw material worked to produce preforms as disclosed in the '371 patent, but was found in the course of the development of the burner of the present invention to not work in the production of thick boules. As described in detail below, to produce thick boules, an oxygen/premix/premix/premix/oxygen arrangement surrounding a fume tube carrying a halide-free raw material needs to be used.

SUMMARY OF THE INVENTION

In view of the foregoing, it is an object of the present invention to provide soot-producing burners that will produce thicker boules and thus increase the yield of fused silica glass and, in particular, high purity fused silica glass and ultra low expansion glass, produced in furnaces of the general type shown in FIG. 7. It is a further object of the invention to provide a silica soot deposition technique that produces fused silica that exhibits very high optical qualities and has a large cross section and thickness.

To achieve these and other objects, the invention in accordance with certain of its aspects provides a method for forming a silica-containing boule (19) comprising:

(a) providing a furnace (100) which comprises:
   (i) a cavity (26);
   (ii) at least one burner (14) which produces a stream of soot particles; and
   (iii) a substantially planar surface (24) within the cavity (26) for collecting the soot particles to form the boule;
(b) providing a halide-free, silicon-containing material to the at least one burner; and
(c) collecting the soot particles to form the boule;
wherein the width of the stream of soot particles is controlled to enhance the efficiency of step (c).

In particular, the width of the stream of soot particles is controlled in accordance with the discovery, illustrated in FIG. 6, that a reduction in the width leads to enhanced efficiency of step (c). That a reduction in width has this effect is counterintuitive since a priori one would think that widening the stream, rather than narrowing it, would result in the laydown of more soot particles.

In quantitative terms, the width of the stream at the working distance is preferably less than 25 millimeters, most preferably, less than 12 millimeters, where the working distance (i.e., the distance between the burner face and the surface of the boule) is at least 150 millimeters and preferably at least 200 millimeters or more.

In accordance with other aspects, the invention provides a method for forming a silica-containing boule (19) comprising the steps of:

(a) providing a substantially planar surface (24);
(b) providing a soot-producing burner (14) having a burner face (13) that comprises first (1), second (2), third (3), fourth (4), fifth (5), and sixth (6) gas-emitting regions, the second region surrounding the first region, the third region surrounding the second region, the fourth region surrounding the third region, the fifth region surrounding the fourth region, and the sixth region surrounding the fifth region;
(c) providing a mixture comprising an inert gas and a halide-free, silicon-containing material to the first region;
(d) providing oxygen to the second region;
(e) providing a mixture of a combustible gas and oxygen to the third region;
(f) providing a mixture of a combustible gas and oxygen to the fourth region;
(g) providing a mixture of a combustible gas and oxygen to the fifth region;
(h) providing oxygen to the sixth region; and
(i) collecting silica-containing soot on the substantially planar surface to form the boule.

In accordance with other aspects, the invention provides a soot-producing burner comprising a burner face which comprises first (1), second (2), third (3), fourth (4), fifth (5), and sixth (6) gas-emitting regions, the second region surrounding the first region, the third region surrounding the second region, the fourth region surrounding the third region, the fifth region surrounding the fourth region, and the sixth region surrounding the fifth region, wherein:

(a) the first region emits a mixture of a halide-free, silicon-containing material and an inert gas;
(b) the second region emits oxygen;
(c) the third region emits a mixture of a combustible gas and oxygen;
(d) the fourth region emits a mixture of a combustible gas and oxygen;
(e) the fifth region emits a mixture of a combustible gas and oxygen; and
(f) the sixth region emits oxygen.

In accordance with certain preferred embodiments of the invention, the radial spacing between the third, fourth, fifth, and sixth regions is substantially the same.

In accordance with other preferred embodiments, the first, second, third, fourth, fifth, and sixth regions have the following forms at the burner's face: the first region is in the form of an open disc or tube, the second region is an annular ring, and the third, fourth, fifth, and sixth regions are each a ring of orifices.

Figure 1:
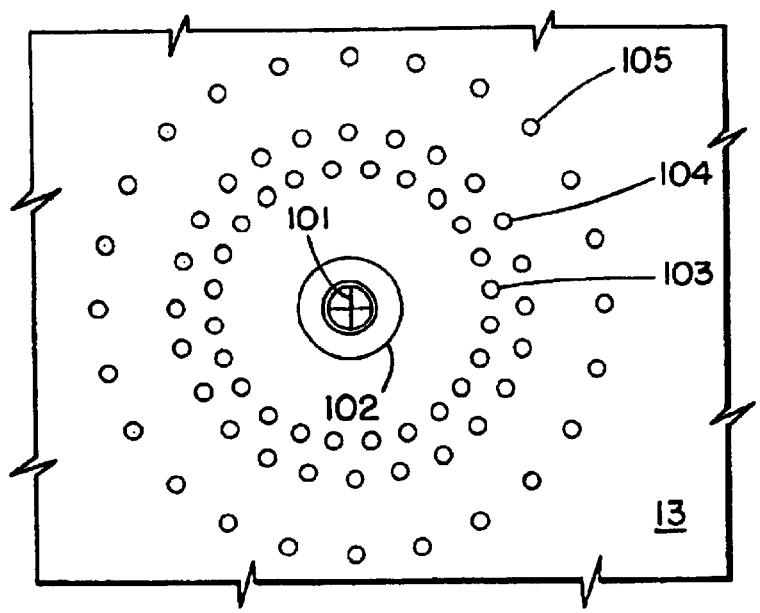
FIG. 1 is a schematic plan view of the face of a prior art burner illustrating the gas-emitting regions of the burner.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention. The drawings are not intended to indicate scale or relative proportions of the elements shown therein.

The reference numbers used in the drawings correspond to the following:

1 first gas-emitting region (fume tube) of burners C and D
2 second gas-emitting region (innershield) of burners C and D
3 third gas-emitting region of burners C and D
4 fourth gas-emitting region of burners C and D
5 fifth gas-emitting region of burners C and D
6 sixth gas-emitting region (outershield) of burners C and D
12 furnace crown
13 burner face
14 burner
15 bottom portion of burner
16 top portion of burner
17 baffle
19 boule
20 innershield channel in bottom portion of burner
21 premix channel in bottom portion of burner
22 outershield channel in bottom portion of burner 24 substantially planar surface for collecting soot particles
26 furnace cavity
27 O-ring
28 O-ring
29 O-ring
30 O-ring
31 fume tube channel in top portion of burner
32 innershield channel in top portion of burner
33 premix channel in top portion of burner
34 outershield channel in top portion of burner
41 fume tube drilled hole in bottom portion of burner
42 innershield annulus in bottom portion of burner
43 premix drilled hole in bottom portion of burner
44 premix drilled hole in bottom portion of burner
45 premix drilled hole in bottom portion of burner
46 outershield drilled hole in bottom portion of burner
50 $CH_4$ supply
51 $O_2$ supply
52 mixer
53 conduit from $CH_4$ supply to mixer
54 conduit from $O_2$ supply to mixer
55 conduit from mixer to baffle in burner
56 conduit from baffle to third gas-emitting region of the burner's face
57 conduit from baffle to fourth gas-emitting region of the burner's face
58 conduit from baffle to fifth gas-emitting region of the burner's face
100 furnace
101 first gas-emitting region (fume tube) of prior art burner of FIG. 1 and burners A, B, E, and F
102 second gas-emitting region (innershield) of prior art burner of FIG. 1 and burners A, B, E, and F
103 third gas-emitting region of prior art burner of FIG. 1 and burners A, B, E, and F
104 fourth gas-emitting region of prior art burner of FIG. 1 and burners A, B, E, and F
105 fifth gas-emitting region (outershield) of prior art burner of FIG. 1 and burners A, B, E, and F

DETAILED DESCRIPTION OF THE INVENTION

As discussed above, the present invention is concerned with burners for use in producing boules of fused silica from halide-free, silicon-containing starting materials. Suitable halide-free, silicon-containing starting materials are those disclosed in Dobbins et al., U.S. Pat. No. 5,043,002 and Blackwell et al., U.S. Pat. No. 5,152,819, the relevant portions of which are incorporated herein by reference. A particularly preferred starting material is octamethylcyclotetrasiloxane (OMCTS).

Figure 4:
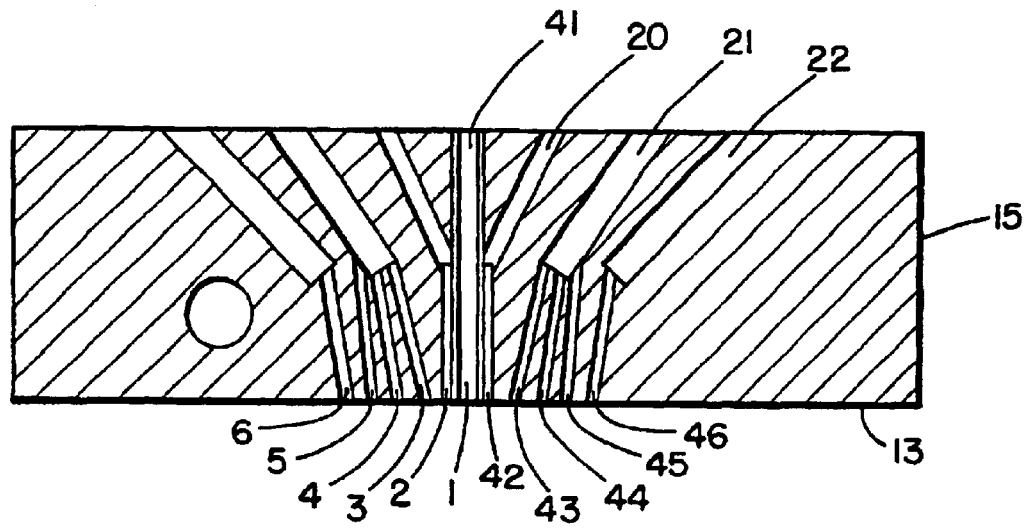
FIG. 4 is a cross-sectional view of the bottom portion of a burner constructed in accordance with the invention. When oriented as shown in FIG. 7, the bottom portion of the burner is the portion nearest the furnace cavity.
Figure 5:
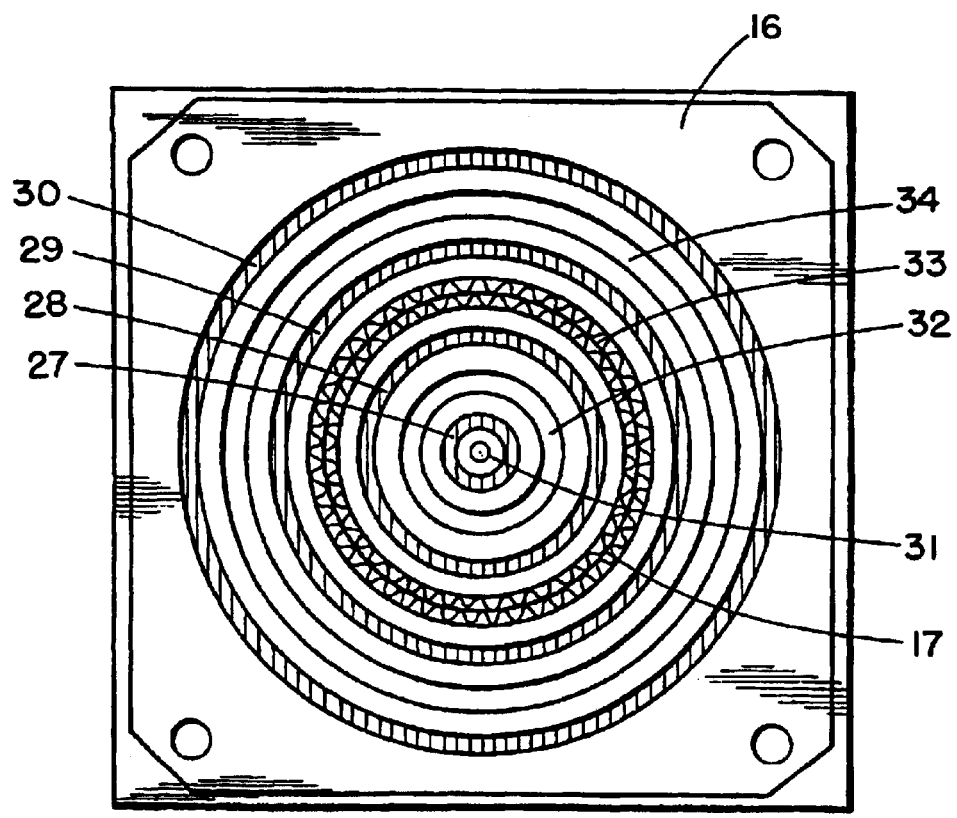
FIG. 5 is a plan view of the cavity-facing surface of the top portion of a burner constructed in accordance with the invention. When oriented as shown in FIG. 7, the top portion of the burner is the portion farthest from the furnace cavity.
Figure 7:
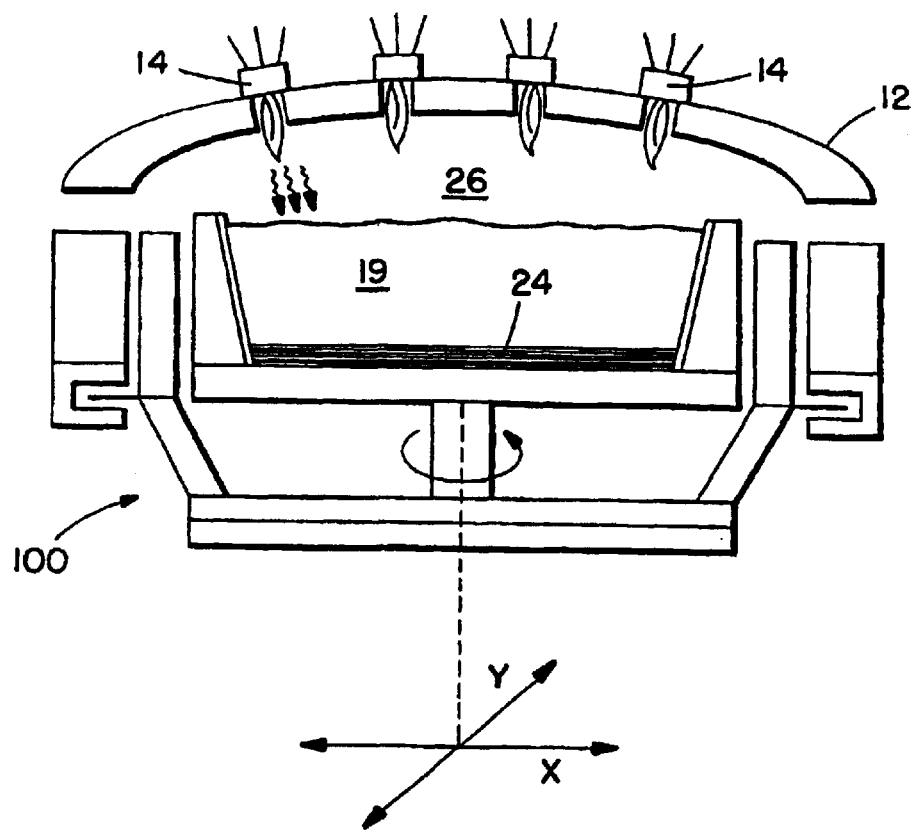
FIG. 7 is a schematic drawing illustrating the general type of furnace with which the burners of the invention can be used.

FIGS. 4 and 5 illustrate a suitable construction for the burner of the invention. As shown therein, the burner includes a bottom portion 15 (see FIG. 4) and a top portion 16 (see FIG. 5). The "bottom" and "top" nomenclature refers to the orientation of the burner during use in a furnace of the type shown in FIG. 7.

As shown in FIG. 5, the top portion of the burner includes fume tube channel 31, inner shield channel 32, premix channel 33, and outershield channel 34 which, during use of the burner, carry a halide-free, silicon-containing starting material, oxygen, a mixture of a combustible gas and oxygen, and oxygen, respectively. Premix channel 33 preferably includes baffle 17 which, as explained below, helps ensure uniform gas emission from region 3 of burner face 13. Top portion 16 also includes O-rings 27, 28, 29, and 30 which serve to seal the top and bottom portions together in the assembled burner.

During use, channels 31, 32, 33, and 34 are provided with the gases used by the burner (e.g., OMCTS mixed with $N_2$, $O_2$, $CH_4$ mixed with $O_2$, and $O_2$, respectively) using a suitable gas delivery system, e.g., regulated gas sources, feed lines, gas mixers, metering pumps, flowmeters, heaters and vaporizers for OMCTS, etc. Suitable flow rates for these materials are as follows: OMCTS—6.0–6.5 grams/minute; $N_2$—4.6–6.4 slpm; innershield $O_2$—7–8 slpm; premix (1:1 $O_2$:$CH_4$)—22 slpm; and outershield oxygen—15.0–17.5 slpm.

As shown in FIG. 4, bottom portion 15 includes channels 41, 20, 21, and 22 which are aligned with channels 31, 32, 33, and 34, respectively, in the assembled burner. Channel 41 passes through the body of bottom portion 15 and creates the burner's first gas-emitting region 1 at burner face 13. Channel 20 communicates with annulus 42 which creates the burner's second gas-emitting region 2 at burner face 13. Channel 21 communicates with drilled holes 43, 44, and 45, which create the burner's third, fourth, and fifth gas-emitting regions 3, 4, and 6, respectively, at burner face 13. Channel 22 communicates with drilled holes 46 which create the burner's sixth gas-emitting region 6 at burner face 13. Drilled holes 43 through 46 are the preferred means for creating gas-emitting regions 3 through 6, although other means, e.g., a continuous annulus, can be used if desired. Conversely, annulus 42 can be in the form of drilled holes, if desired.

Figure 2:
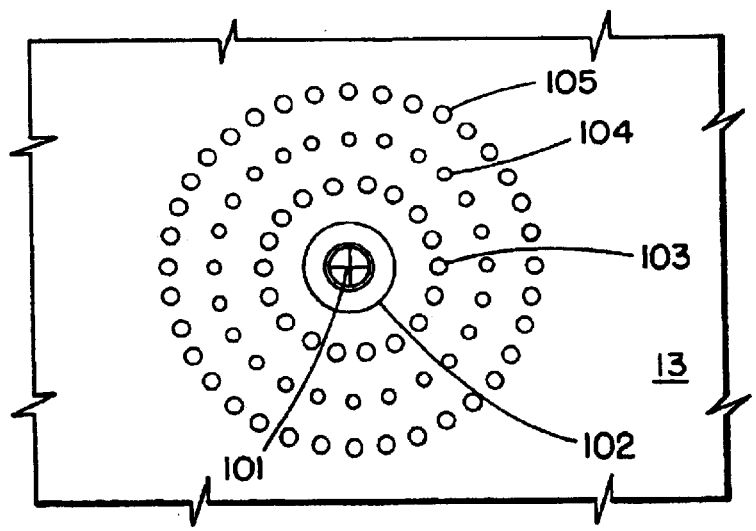
FIGS. 2 and 3 are schematic plan views of the faces of burners used in compiling the experimental data reported herein.
Figure 3:
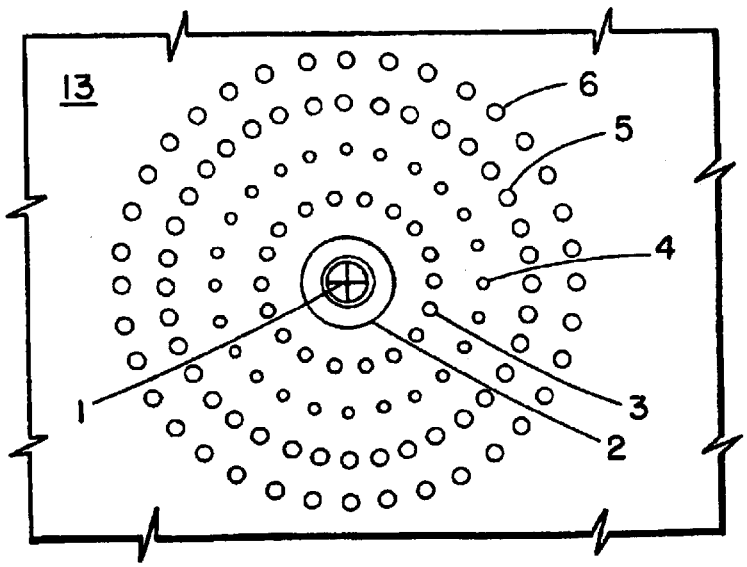

The advantages of the burner construction of the invention can be best understood with reference to FIGS. 1–3 and Tables 1–2. FIG. 1 is a schematic drawing of a prior art burner in which OMCTS flows out of fume tube 101 with nitrogen as a carrier gas, innershield 102 and outershield 105 have oxygen flowing out of them, and a mixture of oxygen and methane exits premix holes 103 and 104.

In this burner, fume tube 101 is flush with or slightly recessed from burner face 13 and innershield 102 is in the form of an annulus. An annulus, rather than a ring of holes, is used for the innershield since burner build up due to polymerization of OMCTS occurred when a ring of holes was used. When $SiCl_4$, instead of OMCTS, was the starting material, a protruding fume tube was used and burner buildup was not observed when the innershield was a ring of holes.

Although the burner of FIG. 1 works successfully in producing boules having a thickness of about 6 inches, it is unable to make glass at long burner to laydown distances. In order to make a thick boule, a burner needs to produce a flame able to make glass at long burner to laydown distances (e.g., greater than 12 inches).

The design modifications studied to achieve longer burner to laydown distances were: focus, decreased velocity of innershield oxygen, decreased velocity of premix, and fume tube size. Focus, i.e., the bringing of the various gas-emitting regions of the burner closer together, was achieved by holding the locations of channels 21 and 22 constant and changing the starting locations and angles of drilled holes 43 through 46. This allowed the same top portion 16 to be used with each burner design. In practice, the change in gas vectors resulting from changes in the angles of holes 43 and 46 has only a secondary effect on the performance of the burner.

Six experimental burners were designed, built, and tested. Table I gives the design modification and the intent of each burner design. For each burner, the key process variables evaluated were particle size, number of particles, mass of particles, and width of the particle stream. The relationship between these key process variables and lay down efficiency and rate were quantified. The flame produced by the burners was evaluated utilizing light scattering measurements, mathematical modeling, single burner development furnace trials, and full scale production furnaces. Light scattering measurements, i.e., measurements of the amount of laser light scattered in various directions by the soot particles in the flame, were used to determine the width of the stream of soot particles produced by the burner. Alternatively, the width can be determined photographically or by visual observation.

FIGS. 2 and 3 are schematic drawings of the burners which were tested and Table 2 gives their dimensions in inches. The abbreviation "Dia BC" used in Table 2 stands for the diameter of the "bolt circle" defined by the holes making up the various gas-emitting regions. FIG. 2 shows the overall design of burners A, B, E, and F, which only include two premix regions, and FIG. 3 shows the overall design of burners C and D, which include three premix regions. The overall design of the prior art burner is shown in FIG. 1.

Burners A and B represent an initial design modification in which a focused burner was created by bringing the burner holes closer together, similar to burners used to produce optical waveguide preforms. Burners A and B are identical except that burner B has a larger innershield.

Burners C and D have an additional ring of premix holes which decrease the velocity of premix. The difference between burners C and D is that burner C is more focused than burner D.

The design modification for burners E and F was the diameter of the fume tube. The fume tube size was increased from 0.085 inches to 0.106 inches. Burner E has the same configuration as the prior art burner with the exception of a larger fume tube. Burner F has the same design as burner B except for the larger fume tube.

The majority of the burners were designed to make a longer, more laminar and more focused jet stream than the prior art burner. For example, when used with the same gas flows, burner A produced a flame that was longer and more laminar like than the prior art burner. However, as set forth in Table 1, this alone did not result in a consistently significant increase in yield.

Rather, it was determined that: (1) the width of the particle stream was inversely proportional to the lay down rate and efficiency; and (2) the burner design that gave the highest deposition rate was a more focused burner with a decrease in velocity of premix.

The burner that had these characteristics was burner D. The advantage of this burner is that it decreases the width and the unsteadiness of the soot stream allowing for a higher deposition rate by increased efficiency. In a production furnace, this burner produced a more laminar like flame and the deposition rate increased by 60%. The flame produced by burner D was 15 inches long so that the burner was able to produce a 2072 pound boule. For comparison, the average boule weight for the prior art burner was 1200 pounds.

In terms of structural features, the elements that are required and which burner D has are: (1) the burner holes are brought closer together, i.e., the burner is focused; and (2) an extra ring of premix is provided. The closer holes decrease the recirculation zone that causes eddies and a more turbulent flame. The extra ring of premix decreases the velocity of the premix and increases the surface area resulting in a more stable and longer flame. Looked at another way, decreasing the velocity of the premix can be thought of as producing a container for the silica particles so that they will stay in the burner flame longer and thus allow one to make boules at a greater distance from the face of the burner, i.e., thicker boules.

In addition to its enhanced efficiency, burner D also has the following desirable performance characteristics:

(1) Since burner D has a more laminar flame, there is less oxygen (from outside air) entrained in the flame by mixing and therefore the flame is more reducing as is generally desirable.

(2) Burner soot rarely accumulates on the burner face. This is a significant advantage since soot accumulation means that burners must be shut down during a furnace run which lowers the deposition rate.

There are two reasons why soot builds up on a burner's face: (a) thermopheresis, and (b) the velocity of the soot particles. The third ring of premix which decreases the velocity and the smaller surface area results in a flame profile that prevents the burner soot from depositing on the burner face.

The lack of soot build up on the burner face also improves the safety of the soot laydown process by decreasing the potential for "snapback." If soot covers the premix holes or plugs the fume tube, a small explosion, known as a "snapback," can occur. Burner D with its reduced soot build up minimizes these possibilities.

The lack of soot build up also makes burner D easier to use since operators spend less time cleaning the burners and in port scraping, i.e., scraping of the burner holes in the furnace crown. Port scraping is decreased because less soot deposits in the ports since the burner is more efficient.

For comparison, burner A, which is similar to burner D in that it has burner holes that have been brought in closer together to produce a more laminar flame, failed to improve yield in a production furnace. Unlike burner D, burner A does not have an extra ring of premix. This result shows that the extra ring of premix is essential in increasing the yield of high purity fused silica glass. Burners E and F also did not increase yield. These burners have a larger fume tube which produced a turbulent flame.

Burner D shares the following common traits with the prior art burner: they both utilize the same top portion of the burner, all connections to the furnace, all gases, and all flow rates are the same, and the burners are made of the same material (aluminum) and are the same size. In addition, the soot particle size and range of particle sizes are the same for the two burners.

The differences between burner D and the prior art burner are: (1) the burner holes of burner D are brought in closer together so that the radial distances between all gas-emitting regions of the burner are substantially the same; and (2) there is an extra ring of premix gases. These differences result in a longer, more laminar like flame, which reduces the width of the particle stream. In addition, burner D produces less soot particles than the prior art burner per unit time.

Figure 6:
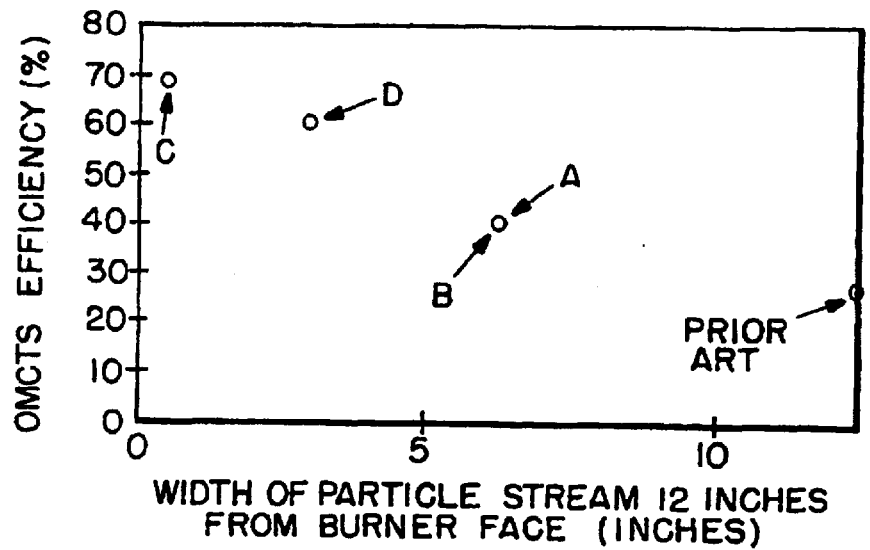
FIG. 6 is a plot of efficiency versus particle stream width.

FIG. 6 is a plot of deposition efficiency vs. width of the particle stream at a distance of 12 inches from the burner face. As can be seen in this figure, the smaller the width of the particle stream, the higher the OMCTS efficiency and thus the deposition rate.

As can also be seen in FIG. 6, burner C's deposition efficiency is even greater than burner D's efficiency. However, the gas-emitting regions of burner C are so close together that manufacture of this burner in quantity can be difficult and for this reason, burner D is preferred. It should be noted that although FIG. 6 shows an improved efficiency for burners A and B, this improvement declines for some OMCTS flow rates used in practice. Burners C and D, on the other hand, exhibit enhanced efficiency over the entire range of OMCTS flow rates typically used in practice.

The relationship between efficiency and particle stream width shown in FIG. 6 is believed to be due to a boundary layer phenomenon in which a more laminar focused stream allows for more of the soot particles to be captured within the boule. That is, when the flame spreads out over a flat surface, because the narrower flame entrains less furnace gases, the boundary layer is thinner and contains more particles which results in increased deposition rates. Furthermore, flames which have a particle stream of decreased width are less turbulent.

Out of all the parameters examined (particle size, range of particle size, number of particles, mass of particle stream, and width of the particle stream), the width of the particle stream had the most influence on the deposition rate and OMCTS efficiency. In terms of controlling the particle stream width, it was found that for burners A–D, this parameter can be controlled (varied) by adjusting the outershield flow rate. By decreasing the outershield flow rate, the flame becomes longer and less turbulent which allows for more soot to be captured. For example, when the outershield gas flow was lowered by 13% for burner D, the efficiency increased from 60% to 68%. This condition yielded a particle stream size and OMCTS efficiency essentially the same as that shown for burner C in FIG. 6.

As discussed above, channel 33 of the burner's top portion 16 includes baffle 17 (see FIG. 5), which serves to generate uniform premix flames. The baffle is preferably placed in the top portion of the burner to spread the gas/oxygen flow in channel 33 before that flow enters the bottom portion. However, if desired, the baffle can be placed in the bottom portion of the burner.

During testing of the D burner, a non-uniform gas-oxygen flame in the inner ring of premix holes (i.e., gas-emitting region 3 in FIG. 4) was observed. This non-uniformity was only slightly noticeable at lower gas flows (<10 LPM methane, 10 LPM oxygen) but as flows increased, it became more apparent. At the deposition flows (18 LPM methane, 20 LPM oxygen), one side of the flame extended ~1/16" from the burner face while the other side was ~1/4", which was considered unacceptable for use on a production furnace.

The non-uniform flame is believed to be the result of the addition of the third ring of holes for gas/oxygen flow, which increases the total hole area over 60%. This results in a change in the flow characteristics between channel 33 of top portion 16 and the gas outlet at the burner face resulting in a non-uniform gas flow through the outlet holes. Neither the second nor the third ring of holes used for gas/oxygen flow, located towards the outershield, exhibited the flame variability.

Figure 8:
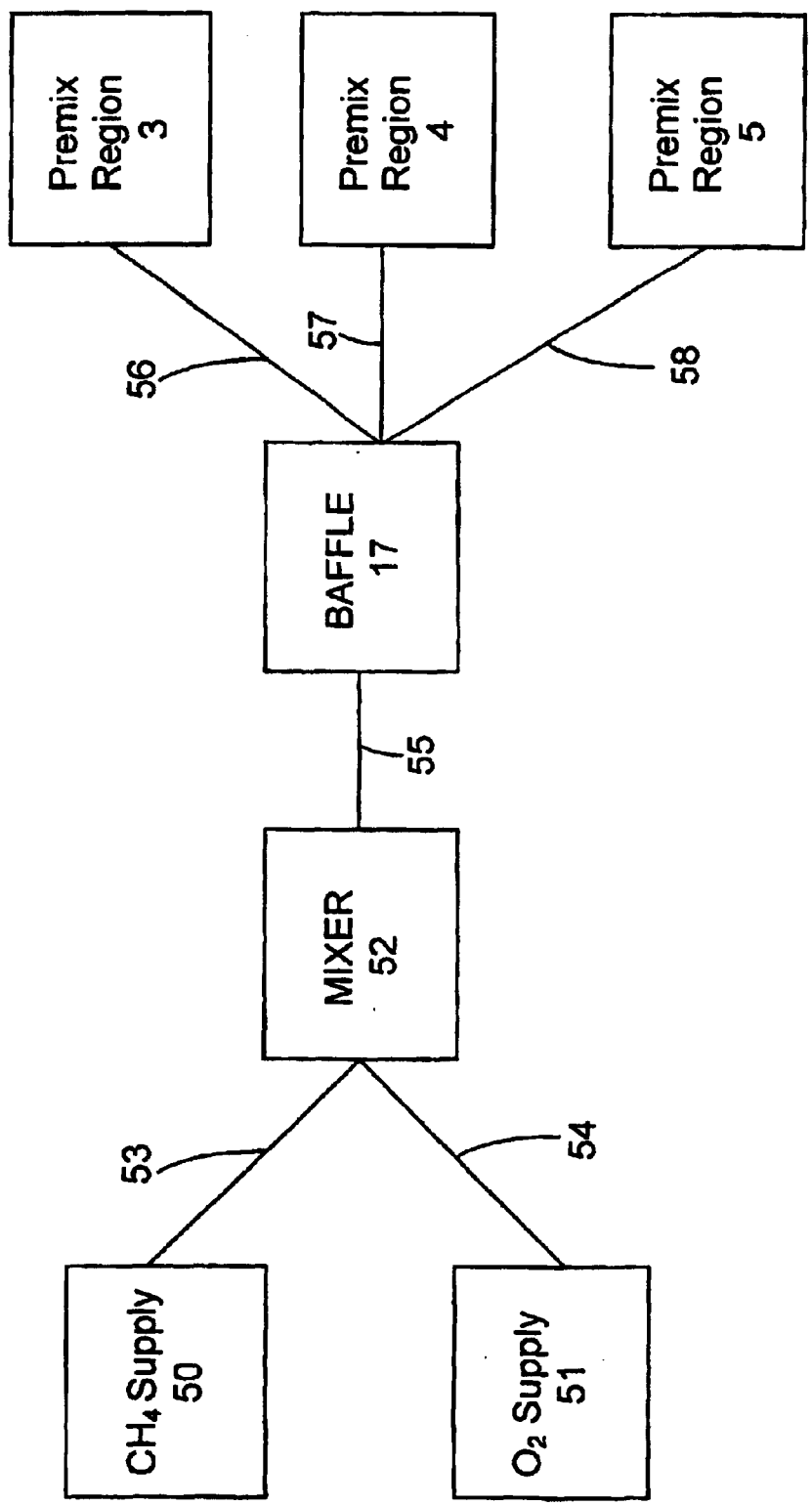
FIG. 8 is a schematic drawing illustrating the use of a baffle in connection with a burner having three premix regions.

In accordance with the invention, a baffle is used to reduce this variability in the burner flame. The overall arrangement of the baffle in the furnace system is shown in FIG. 8. As illustrated therein, a $CH_4$ supply 50 and an $O_2$ supply 51 are connected to a mixer 52 by conduits 53 and 54, respectively. Conduit 55 connects mixer 52 to the burner. In particular, the $CH_4/O_2$ mixture produced by mixer 52 is provided to baffle 17, which in the preferred embodiments of the invention is located in channel 33 of the top portion 16 of the burner (see FIG. 5). From baffle 17 the $CH_4/O_2$ mixture is carried to regions 3, 4, and 5 of burner face 13 by conduits 56, 57, and 58, respectively. As shown in FIG. 4, in the preferred embodiments of the invention, conduits 56, 57, and 58 comprise channel 21 and drilled holes 42, 43, and 44, respectively.

Various types of baffles can be used in the practice of the invention. For example, aluminum rings containing 36 holes with equal spacing and having a diameter of either 0.040" or 0.060" diameter can be used. An insert cut from a SCOTCH BRIGHT pad can also be used. Tests with both the aluminum rings and the SCOTCH BRIGHT pad showed that these baffles eliminated the flame non-uniformity. The aluminum rings, however, had severe gas/oxygen ratio limitations that resulted in a loud, high pitched sound and prevented use of the burners at the desired premix flow rates. The SCOTCH BRIGHT pad design did not have this limitation, but was made from a material different from that of the burners, i.e., it was not made of aluminum.

A preferred baffle construction comprises a corrugated aluminum baffle of the type shown in FIG. 5. This baffle can be prepared by cutting narrow strips (e.g., 3/16" wide) from a rolled aluminum sheet (e.g., 0.012" thick), crimping the strips, curling them into rings, and then slip fitting them into channel 33. Preferably, after the strips are trimmed to length, the ends of the strips are crimped, leaving the middle section uncrimped. The strips can be installed by hand or using a tool. The tool can, for example, comprise a center tip for alignment with channel 31, an inner moveable ring around which the strips are wrapped, and an outer fixed ring which holds the strips in place prior to insertion. By moving the inner ring, the baffle is moved into top portion 16, while the outer ring holds the baffle in alignment with channel 33.

When properly installed, the crimped strips form a baffle with numerous openings ~0.100" across and 3/16" long. The baffle produces a uniform laminar flow with little, if any, back pressure, and corrects the flame non-uniformity problem. In addition, it is inexpensive and easy to install. Among its various advantages, the use of a baffle minimizes the chances for a snapback as a result of non-uniformity in the premix cones (flames).

Although preferred and other embodiments of the invention have been described herein, further embodiments may be perceived by those skilled in the art without departing from the scope of the invention as defined by the following claims.

TABLE 1

Test Burner Designs And The Intent Of Same

| Burner | Description of Burner | Intent of Design | Did it increase yield? |
|---|---|---|---|
| A | (a) Focused - burner holes brought closer together | (a) Produce a longer and laminar type flame | In some cases yield increased significantly while in others it did not. |
| B | (a) Focused (b) Larger diameter inner shield | (a) Longer and laminar like flame (b) Decrease velocity of innershield | In some cases yield increased significantly while in others it did not. |
| C | (a) Very focused (b) Additional ring of premix | (a) Longer and laminar like flame (b) Decrease velocity of premix | Yes; yield increased significantly in all cases. |
| D | (a) Additional ring of premix (b) Focused | (a) Longer and laminar like flame (b) Decrease velocity of premix | Yes; yield increased significantly in all cases. |
| E | (a) Large fume tube | (a) Decrease velocity of OMCTS | No; yield decreased. |

TABLE 1-continued

Test Burner Designs And The Intent Of Same

| Burner | Description of Burner | Intent of Design | Did it increase yield? |
|---|---|---|---|
| F | (a) Focused (b) Large fume tube | (a) Longer and laminar like flame (b) Decrease velocity of OMCTS | No; yield decreased |

TABLE 2

Dimensions Of Test Burners

| | | Prior Art Burner | Burner A | Burner B | Burner C | Burner D | Burner E | Burner F |
|---|---|---|---|---|---|---|---|---|
| Fume Tube | ID | 0.085 | 0.085 | 0.085 | 0.085 | 0.085 | 0.106 | 0.106 |
| | OD | 0.109 | 0.109 | 0.109 | 0.109 | 0.109 | 0.134 | 0.134 |
| | Angle | 0 | 0 | 0 | 0 | 0 | 0 | 0 |
| Innershield | Dia | 0.177 | 0.177 | 0.220 | 0.177 | 0.177 | 0.220 | 0.220 |
| | Angle | 0 | 0 | 0 | 0 | 0 | 0 | 0 |
| Premix 1 | Dia BC | 0.594 | 0.340 | 0.340 | 0.310 | 0.340 | 0.594 | 0.340 |
| | # | 24 | 18 | 18 | 18 | 18 | 24 | 18 |
| | Dia Holes | 0.040 | 0.040 | 0.040 | 0.040 | 0.040 | 0.040 | 0.040 |
| | Angle | 0 | 14.25 | 14.25 | 15.28 | 13.65 | 0 | 14.25 |
| Premix 2 | Dia BC | 0.750 | 0.530 | 0.530 | 0.470 | 0.530 | 0.750 | 0.530 |
| | # | 24 | 24 | 24 | 24 | 24 | 24 | 24 |
| | Dia Holes | 0.040 | 0.040 | 0.040 | 0.040 | 0.040 | 0.040 | 0.040 |
| | Angle | 0 | 14.25 | 14.25 | 13.33 | 9.77 | 0 | 14.25 |
| Premix 3 | Dia BC | | | | 0.630 | 0.720 | | |
| | # | | | | 32 | 36 | | |
| | Dia Holes | | | | 0.040 | 0.040 | | |
| | Angle | | | | 13.33 | 6.65 | | |
| Outershield | Dia BC | 1.094 | 0.720 | 0.720 | 0.790 | 0.910 | 1.094 | 0.720 |
| | # | 24 | 36 | 36 | 36 | 36 | 24 | 36 |
| | Dia Holes | 0.040 | 0.040 | 0.040 | 0.040 | 0.040 | 0.040 | 0.040 |
| | Angle | 0 | 21.63 | 21.63 | 15.28 | 9.77 | 0 | 21.63 |

What is claimed is:

1. A method for forming a silica-containing boule comprising the steps of:
   (a) providing a substantially planar surface;
   (b) providing a soot-producing burner having a burner face that comprises first, second, third, fourth, fifth and sixth gas-emitting regions, the second region surrounding the first region, the third region surrounding the second region, the fourth region surrounding the third region, the fifth region surrounding the fourth region, and the sixth region surrounding the fifth region;
   (c) providing a mixture comprising an inert gas and a halide-free, silicon-containing material to the first region;
   (d) providing oxygen to the second region;
   (e) providing a mixture of a combustible gas and oxygen to the third region;
   (f) providing a mixture of a combustible gas and oxygen to the fourth region;
   (g) providing a mixture of a combustible gas and oxygen to the fifth region;
   (h) providing oxygen to the sixth region; and
   (i) collecting silica-containing soot on the substantially planar surface to form the boule.

2. The method of claim 1 wherein the burner produces a stream of soot particles and the width of the stream of soot particles is controlled to enhance the efficiency of step (i).

3. The method of claim 2 wherein the width of the stream of soot particles is reduced to enhance the efficiency of step (i).

4. The method of claim 2 wherein the width of the stream of soot particles is controlled by controlling the amount of oxygen provided to the sixth region.

5. The method of claim 1 wherein the mixture of a combustible gas and oxygen is provided to the third region through a baffle.

6. The method of claim 5 wherein the mixture of a combustible gas and oxygen is provided to the fourth and fifth regions through a baffle.

7. The method of claim 1 wherein the third, fourth, fifth and sixth regions are radially spaced from one another by substantially the same distance.

8. The method of claim 1 wherein the boule has a thickness greater than six inches.

9. The method of claim 1 wherein the silica-containing soot is consolidated as it is being collected in step (i).

10. A method for forming a silica-containing boule comprising:
    (a) providing a furnace which comprises:
        (i) a cavity;
        (ii) at least one burner which produces a stream of soot particles; and
        (iii) a substantially planar surface within the cavity for collecting the soot particles to form the boule;
    (b) providing a halide-free, silicon-containing material to the at least one burner; and
    (c) collecting the soot particles produced by the at least one burner to form the boule;
    wherein the width of the stream of soot particles is controlled to enhance the efficiency of step (c).

11. The method of claim 10 wherein the width of the stream of soot particles is reduced to enhance the efficiency of step (c).

12. The method of claim 10 wherein the at least one burner has a burner face and the width of the stream of soot particles is less than 25 millimeters at a distance of 150 millimeters from said face.

13. The method of claim 12 wherein the width of the stream of soot particles is less than 12 millimeters at a distance of 150 millimeters from said face.

14. The method of claim 10 wherein the at least one burner has a burner face and the width of the stream of soot particles is less than 25 millimeters at a distance of 200 millimeters from said face.

15. The method of claim 14 wherein the width of the stream of soot particles is less than 12 millimeters at a distance of 200 millimeters from said face.

16. The method of claim 10 wherein the boule has a thickness greater than six inches.

17. The method of claim 10 wherein the soot particles are consolidated as they are collected in step (c).

18. A soot-producing burner comprising a burner face which comprises first, second, third, fourth, fifth and sixth gas-emitting regions, the second region surrounding the first region, the third region surrounding the second region, the fourth region surrounding the third region, the fifth region surrounding the fourth region, and the sixth region surrounding the fifth region, wherein:

(a) the first region is coupled to a source of a mixture of a halide-free, silicon-containing material and an inert gas;

(b) the second region is coupled to a source of oxygen;

(c) the third region is coupled to a source of a mixture of a combustible gas and oxygen;

(d) the fourth region is coupled to a source of a mixture of a combustible gas and oxygen;

(e) the fifth region is coupled to a source of a mixture of a combustible gas and oxygen; and (f) the sixth region is coupled to a source of oxygen.

19. The burner of claim 18 wherein the third, fourth, fifth and sixth regions are radially spaced from one another by substantially the same distance.

20. The burner of claim 18 wherein the burner comprises a baffle and the mixture of a combustible gas and oxygen emitted by the third region passes through the baffle before being emitted from the face of the burner.

21. The burner of claim 20 wherein the mixture of a combustible gas and oxygen emitted by the fourth and fifth regions passes through the baffle before being emitted from the face of the burner.

22. An apparatus for producing silica-containing soot comprising:

(a) a source of a mixture of combustible gas and oxygen;

(b) a burner for producing silica-containing soot; and (c) a source-to-burner conduit for carrying the mixture of a combustible gas and oxygen from the source to the burner;

wherein the burner comprises:

(i) a burner face which comprises three concentric gas-emitting regions, each of which emits the mixture of combustible gas and oxygen;

(ii) three gas-carrying conduits, one conduit connected to each of said three gas-emitting regions; and (iii) a baffle between the source-to-burner conduit and the three gas-carrying conduits.

* * * * *